(12) United States Patent
Gosger et al.

(10) Patent No.: US 7,310,994 B2
(45) Date of Patent: Dec. 25, 2007

(54) METHOD AND DEVICE FOR OBTAINING A DETERMINED FLOW RESISTANCE OF A FLOW CHANNEL BY MEANS OF A MEASURING BRIDGE

(75) Inventors: Peter Gosger, Solingen (DE); Armin Walther, Kaufbeuren (DE); Patrick Matt, Marktoberdorf-Leuterschach (DE); Alfred Ernst, Sontheim (DE)

(73) Assignee: Extrude Hone GmbH, Remscheid (DE)

( * ) Notice: Subject to any disclaimer, the term of this patent is extended or adjusted under 35 U.S.C. 154(b) by 52 days.

(21) Appl. No.: 10/503,448

(22) PCT Filed: Jan. 23, 2003

(86) PCT No.: PCT/EP03/00633

§ 371 (c)(1),
(2), (4) Date: Aug. 3, 2004

(87) PCT Pub. No.: WO03/066264

PCT Pub. Date: Aug. 14, 2003

(65) Prior Publication Data

US 2005/0092609 A1    May 5, 2005

(30) Foreign Application Priority Data

Feb. 4, 2002    (DE) ................. 102 04 561

(51) Int. Cl.
*G01M 3/02* (2006.01)
(52) U.S. Cl. .......................................... 73/37
(58) Field of Classification Search ................. 73/37
See application file for complete search history.

(56) References Cited

U.S. PATENT DOCUMENTS

| 2,266,566 | A |   | 12/1941 | Poole |
|-----------|---|---|---------|-------|
| 3,728,894 | A | * | 4/1973  | Stern ..................... 73/37.5 |
| 4,550,592 | A | * | 11/1985 | Dechape ................ 73/37.5 |
| 4,995,949 | A |   | 2/1991  | Rhoades |
| 5,347,847 | A |   | 9/1994  | Ogden et al. |
| 5,865,977 | A |   | 2/1999  | Frembgen |

FOREIGN PATENT DOCUMENTS

EP    0 802 009 A1    10/1997

* cited by examiner

*Primary Examiner*—Hezron Williams
*Assistant Examiner*—Rodney Frank
(74) *Attorney, Agent, or Firm*—The Webb Law Firm

(57) ABSTRACT

The invention relates to a method and device for obtaining a determined flow resistance of a flow channel, especially an opening in a component. The method involves the following steps: a liquid flows through the flow channel; a characteristic depending on the flow resistance of the flow channel in the component is determined; and the flow channel is machined by means of a working method until said characteristic reaches a pre-determined nominal value.

10 Claims, 1 Drawing Sheet

METHOD AND DEVICE FOR OBTAINING A DETERMINED FLOW RESISTANCE OF A FLOW CHANNEL BY MEANS OF A MEASURING BRIDGE

BACKGROUND OF THE INVENTION (1) Field of the Invention

This invention relates to a method and device for obtaining a determined flow resistance of a flow channel, in particular of an opening in a component.

This invention relates in general to the machining and sizing of flow channels, in particular of openings or mouths, and preferably of small openings, where it is necessary to achieve a critical flow resistance, as well as the correct balancing of flow resistances in a number of such flow channels.

(2) Description of the Related Art

The significance of the impedance of a flow channel is well known. Examples include, among other things, fuel injector nozzles, spray nozzles, the flow of cooling air through components of turbines, the dosing of lubricating oil for precision bearings etc. In many such applications an exact dosing of flows is of very great significance, but as a result of manufacturing limitations it likewise involves significant problems. Even very small differences in the manufacturing tolerances can cause major changes in the flow resistance and in the flow.

Moreover, parts are frequently cast or fabricated from a material that is selected for specific properties such as its conductivity or insulating action for heat or electricity, low weight, a coefficient of expansion during heating or cooling, cost etc., although there is a different set of requirements regarding the inside surface of the opening. These special requirements for the inside of the passage can be met by plating or coating with a metal that has the desired characteristics. Plating can be done by electroplating or electroless (autocatalytic) plating, while the coating can also be done by vacuum metallizing or the use of a carrier gas or another such technology. Electroless plating or vacuum metallizing is generally used to plate or coat the inner surface of castings, borings etc., where secondary cathodes for a uniform electroplating are difficult to place.

Parts with flow openings for a fluid are manufactured by a variety of casting and machining operations. For example, high-quality precision molding methods can be used for the fabrication of these parts. Nevertheless, there are certain differences in the dimensions of such parts, in particular with regard to wall thicknesses, which are due to minor alignment errors in the core or the result of a displacement of the core, as well as fluctuations in the surface characteristics, in particular the roughness of the surface, small pits, nicks, grooves, blisters or positive metal. In the extreme case, a very small crack in the core can result in a thin wall which projects into an inner passageway. All these factors can significantly alter the flow of the fluid.

Machining methods that are in current use, such as electrical erosion machining and laser drilling, or less common technologies such as drilling by means of an electron beam, electrical current and STEM drilling (an ECM technology that uses an acid fluid) are not sufficiently precise to prevent significant changes in the flow resistance. Even the most accurate of these methods, electroerosion machining, will not achieve a perfectly uniform flow resistance, because the length of an internal passageway can vary as a result of the machining method used, and can in turn cause fluctuations in the overall length of the hole and of the flow resistance, regardless of the uniformity of the diameter of the hole. Furthermore, non-uniform conditions are unavoidable in electroerosion machining and can result in variations in the size, shape, surface and condition at the edge of the hole.

Openings to be plated or coated must be sufficiently oversized to leave room for a corresponding thickness or the plating or of the coating, and the ultimate precision depends on the exact calculations for the plating or coating rates and on the accuracy of the drilling and plating operations. The product that can be achieved using current technology is not sufficiently uniform for most precision industrial applications. Thus there are restrictions on the choice of methods available to the manufacturer for the fabrication of the overall part from materials that have the properties desired for the opening or for the embedding of drilled parts with specified properties in castings that have been realized to receive them. These technologies have the precision problems related to drilling described above. The plating of openings that are bored into a material with metal that has different characteristics or even with the same metal, which results in a precision flow, opens up a whole new range of possibilities in the manufacture of many parts.

In many applications, the variances that are inherent to the drilling operations can be accepted within broad limits, and the related compromises regarding freedom of design, construction and performance are simply accepted as inevitable. For example, the delivery of measured quantities of fuel in internal combustion engines by pressure injection of the fuel requires the measured discharge of the flow through nozzles.

Greater accuracy in the regulation of the flow will make possible an improved utilization of the fuel, as well as increases in the economy and precision of the operation of the engine. The realization of fuel dosing systems of this type in current use is frequently based on the measurement of the actual flow resistance and a distribution of the inventories in ranges of flow parameters, to achieve an at least approximate matching of parts in an inventory within a range of deviation of specified tolerances. A method of this type is extremely complex on account of the significant inventory requirements. A significant number of parts also fall outside the range of the allowable deviations and must be reprocessed at great expense or rejected.

In the past, fuel injection nozzles were fabricated so that the critical dosing openings for the flow were formed by electroerosion machining, Because a number of components have flow channels that are becoming increasingly smaller and must be calibrated, i.e. set to a specified flow resistance, homogenization, essentially of the inlet edge of the flow channel, is becoming increasingly important, because the smaller the dimensions of the flow channel, the less appropriate mechanical machining methods become.

Another example in which the flow resistance of an opening is of critical importance is the creation of a cooling flow through gas turbine components such as turbine blades.

Turbine blades manufactured using precision casting techniques are typically cast or drilled (by means of laser drilling, STEM drilling or electroerosion machining) so that a number of holes are created that typically have a nominal diameter of approximately 0.3 mm to 0.8 mm and extend from the internal passageway to the vicinity of the leading edge of the profile, the trailing edge of the profile or any point along the blade profile.

To cool the blades, cooling air is displaced from the interior through the numerous holes into a current of high-temperature combustion gas. During this process, holes in the inner walls of the blades apportion the distribution of the cooling air. It is obvious that changes in the flow resistance can result in differences in the cooling action, which can lead to hot spots that alter the thermal equilibrium inside the components and the engine itself and can influence both the performance and the useful life of the components. The use of cooling air should be minimized, however, because the excessive use of cooling air reduces the efficiency of the engine by "stealing" energy from the compressor stage. When components of this type are used, a more precise control of the flow resistance of these passageways can result in a significant gain in efficiency of both the components and the units in which said components are integrated.

In addition to heads for fuel injector nozzles, spray nozzles, for the flow of cooling air through components of turbines and for the delivery of measured quantities of lubricating oil for bearings, there are numerous other uses of passageways or openings that are used to regulate or control a flow in which this invention can be used.

EP 0 441 887 B1 describes a method of the prior art for the treatment of openings to achieve a determined flow resistance in which a working fluid with which an opening is being machined flows through an opening and at a constant pressure the flow rate that varies during the machining is measured. In the alternative, the flow rate could be maintained constant while the varying pressure could be measured. As soon as the flow rate reaches a determined value or the pressure drops to a determined value, the machining process is interrupted. Of course, with this method flow resistances of the opening with regard to a fluid can be set accurately, although the specification of a constant pressure or a constant flow rate turns out to be complicated and time-consuming.

The object of this invention is therefore to create an improved method to achieve a specified flow resistance of a flow channel and a simplified device that is suitable in particular for the performance of the method, by means of which a flow channel of a component can be accurately calibrated with respect to its flow resistance and which specifically uses structurally less complex and expensive means than similar methods of the prior art.

BRIEF SUMMARY OF THE INVENTION

The method claimed by the invention to achieve a determined flow resistance of a flow channel, in particular of an opening in a component, comprises the following steps: a fluid flows through the flow channel; a parameter is determined which is a function of the flow resistance of the flow channel in the component; the flow channel is machined using a working machine until the parameter reaches a specified set point; and is characterized by the fact that the parameter is determined by means of a measuring bridge.

The determination of the parameter by means of a measuring bridge has the advantage that the parameter can be determined accurately regardless of the fluctuations of a pressure or a flow rate of the fluid. In particular for a balancing of the measuring bridge and the related electroless measurement, fluctuations of the type that are caused by a piston pump, for example, do not play any role. Therefore means that stabilize the pressure in the fluid and/or the flow rate of the fluid are superfluous. As soon as the parameter has reached the set point, the working step is discontinued. An automatic control system can be used to discontinue the working step.

The term measuring bridge is borrowed from electrical engineering and in its simplest realization represents four related complex impedances.

Complex impedances are resistances which, in addition to the actual resistance (e.g. the Ohmic resistance for fluid dynamics, in which the declining pressure over a flow resistance is proportional to the flow rate) also includes virtual components that are caused by inertial impedances or compression resistances, and are reflected in a phase angle between the pressure and the flow rate.

To help explain the measuring bridge in terms of flow mechanics or fluid dynamics, it is helpful to use an analogy from electrical engineering, whereby the pressure that prevails in a fluid corresponds to an electrical potential and the flow rate of a fluid to the intensity of the electric current.

With the balancing of the measuring bridge and electroless measurement, the parameter by means of which the flow resistance of the flow channel is determined can be determined very accurately. In practice, accuracies of approximately one one-thousandth (0.1%) can be achieved.

Errors in the determination of the parameter in a measuring bridge can occur if the density of the fluid varies, for example as a result of the formation of bubbles, although such errors are not critical at the pressures used for the working methods in question of at least 20 bar, in particular of at least 50 bar, and preferably at more than 70 bar for the machining of components on devices that are conventionally made of high-grade steel or at the conventional temperatures of less than 100° C., or with the conventional use of water as the fluid.

As an alternative, the invention teaches that it is preferable to use an average machining pressure between 3 to 8 bar, preferably 4 to 6 bar, and in particular 5 bar, whereby depending on the pressure selected, in particular ordinary plastics can be used, depending on the pressure selected, i.e. in particular the lines of the bridge, for example can be fabricated from standard commercial PVC tubes.

Electroless measurement makes it possible to measure the parameter independently of fluctuations of the pump that pumps the fluid through the measuring bridge and the flow channel. On the other hand, that means that even pumps can be used that are not required to meet any stringent requirements in terms of their constant delivery or their pressure stability. As a result of the use of a balanced measuring bridge, means to stabilize the pressure in the fluid or the flow rate become superfluous. The result is that a parameter is determined with a high degree of precision and can be used with a high degree of precision to calibrate a certain flow resistance of a flow channel.

The invention teaches that it is preferable to take measurements during a pause in the machining, i.e. the machining process can advantageously be influenced in periods of 3 to 5 seconds, for example, when there is no electric current being applied between the cathode and the component being calibrated and no material is being removed. In particular, the invention teaches that the cathode(s) are also briefly removed from the flow channels during the pauses in machining, to eliminate the characteristic of the fluid that varies during a machining operation with regard to its flow on one hand and with regard to its reaction to iron hydroxide and hydrogen on the other hand.

The set point is advantageously specified by selecting the components that are present in the measuring bridge with regard to their resistances or their impedances so that the measuring bridge is balanced when a certain flow resistance is reached.

The flow channel is machined using a working method until the parameter reaches a specified set point. The working method that is used to machine the flow channel is preferably selected from the group that includes chemical machining, hydroabrasive machining, mechanical machining, electrochemical machining, electroerosion machining, electroplating, electroless plating, coating and vacuum metallizing. With these working methods, small flow channels with opening diameters of a few tenths of a micrometer can be accurately machined and calibrated in connection with the method claimed by the invention, whereby the geometric dimensions of the flow channel are modified so that, depending on the working method selected, the flow resistance increases or decreases during the machining, and whereby by means of the method claimed by the invention flow resistances of a flow channel, for example of spray nozzles or gas turbine components, can be accurately calibrated with tolerances of better than 1%.

A measuring bridge constructed according to the principle of a Wheatstone bridge is advantageously used, in which the flow channel is connected by means of a first line with a first flow resistance to form a first series circuit and a second flow resistance is connected by means of a second line to a third flow resistance to form a second series circuit, and in which the first and the second series circuits are connected to form a parallel circuit, whereby a fluid flows through the parallel circuit and as the parameter, the pressure differential of the fluid between the first line and the second line and/or a flow rate in a third line which connects the first line with the second line is determined, and/or the combination of the two.

The Wheatstone bridge represents a basic variant of the measuring bridge, whereby the components used have an Ohmic resistance pattern. The term "impedance" in this case means a component that has the physical characteristic of a flow resistance.

The analogy of fluid or hydrodynamics to electrical engineering with an Ohmic resistance is restricted by the fact that a non-linear response of resistances in hydrodynamics begins very early on account of turbulence and eddies, so that the flow resistance of an impedance or a flow channel already exhibits a non-linear response even at moderate flow rates. In particular, when eddies are formed (generally at a Reynolds number of approximately 1000), the flow resistance increases sharply, and superproportionally as the flow rate of the fluid increases. Impedances in hydrodynamics are not exactly the same as Ohmic resistances in electricity. However, it is possible, in a range around an average flow rate or an average pressure, to linearize the flow resistance, so that nevertheless in this range, with suitably adjusted resistance parameters, the analogy to Ohmic resistance will stand up.

When the measuring bridge is balanced, the quotient of the flow resistance of the third impedance and the flow resistance of the second impedance is equal to the quotient of the flow resistance of the current channel and the flow resistance of the first impedance. When the measuring bridge is balanced, the pressure differential of the fluid between the first line and the second line disappears, or the flow rate in a third line that connects the first line with the second line disappears.

This disappearance of the differential pressure or the flow rate, independently of the total flow rate which flows through the entire parallel circuit, is brought about solely by the conditions of the respective flow resistances. If the three impedances are specified, it can be determined with great accuracy by means of the balancing condition, when the desired impedance of the flow channel is achieved. While the parameter is being determined by means of the measuring bridge, the flow channel is thereby machined with a working method until the parameter disappears. It is advantageous if detectors that have a high resolution are used to detect the parameter, in particular when the parameter is disappearing.

The precision of the method to achieve a determined flow resistance is determined exclusively by the constancy of the flow resistances of the flow channels and by the resolution capability of the detector. Using the method claimed by the invention, the flow resistance of a flow channel can be set with a precision of approximately one one-thousandth (0.1%).

It is advantageous to determine the set point for a specifiable average flow rate or for a specifiable average pressure. This capability is advantageous in particular if average flow rates or average pressures are taken into consideration, in which the flow resistance of the flow channel exhibits a non-linear response. By specifying an average flow rate or an average pressure, errors can be prevented that might result from this non-linearity.

In one particular configuration of the method claimed by the invention, the set point is determined by means of a master object. For this purpose, the flow channel is replaced by the master object and the parameter is then determined. By means of the master object, a desired flow resistance and thus the set point for the parameter can be specified. As the method is carried out, the flow channel is machined until the parameter and thus the flow resistance of the flow channel are exactly equal to that of the master object.

At least one resistance from the group that includes the first impedance, the second impedance and the third impedance is advantageously variable. As a result of the variability of at least one resistance of the three impedances, a determined set point can be specified which is then reached when the component is machined until the condition of balance is achieved in the measuring bridge. For example, the flow resistance of at least one impedance is varied so that the measuring bridge is equalized with the master object. This variability guarantees that the measuring bridge can be used for different set points. In particular, it thereby becomes quickly and easily possible to calibrate different flow channels with different flow resistances.

The variability of a resistance of an impedance can result from the fact that the opening cross section of the impedance for the fluid is varied. The clear cross section of an individual opening as well as the number of a plurality of openings connected in parallel can thereby be decreased or increased.

In any case it is advantageous if the variable resistance can be specified so that the measuring bridge is balanced as soon as the desired set point of the flow channel is achieved. The balanced status of the measuring bridge is thereby specified. A electroless measurement makes possible a high degree of precision in the calibration of the flow channel.

It is advantageous if the variable resistance is specified by means of a master object, by replacing the flow channel with the master object and if the measuring bridge is balanced by calibrating the variable resistance. Consequently, a flow channel can be set without requiring complex or time-consuming data processing. The master object represents a reference object with which the set point is determined and the working method is continued until the impedance of the current channel has the desired flow resistance.

For the method claimed by the invention, the fluids used can be electrolytic solutions, corrosive fluids, dielectric fluids, acids, alkaline solutions and/or carrier gases. With such fluids, flow channels such as openings or other cavities where access is difficult can thereby be machined advantageously from inside.

The parameters are advantageously determined by means of a lock-in method. For this purpose, the pressure of the fluid flowing through the flow channel and/or the flow rate through the flow channel is modulated with a modulation frequency and the parameter is subjected to a frequency-selective analysis and amplification at the corresponding modulation frequency. To generate the modulation, it is advantageous to use the pump that is used to transport the fluid. For example, a piston pump specifies a modulation frequency by its frequency of rotation. Using the lock-in method, the noise of the detectors and/or of the electronic components (e.g. thermal noise) can be suppressed to a significant extent. The signal-to-noise ratio and thus the tolerances that can be achieved with the method in the calibration of flow channels can be improved by a factor of 100 to 1000.

The device claimed by the invention to achieve a determined flow resistance of a flow channel, in particular an opening in a component, preferably for the performance of the method claimed by the invention, comprises a device for the generation of a fluid current, a fluid reservoir and a measuring bridge for the determination of a parameter which is a function of the flow resistance of the flow channel in the component.

By means of the measuring bridge a electroless determination of the flow resistance of the flow channel becomes possible, which offers a high degree of precision in the calibration of a flow channel. In the balanced state, a electroless measurement is performed with the measuring bridge which is largely independent of fluctuations of the pressures or the flow rate in the device.

The measuring bridge is advantageously constructed according to the principle of a Wheatstone bridge, in which the flow channel is connected by means of a first line with a first impedance to form a first series circuit, and a second impedance is connected by means of a second line with a third impedance to form a second series circuit, and in which the first and second series circuits are connected to form a parallel circuit, whereby on the first line and on the second line there are respective pressure sensors and/or between the first line and the second line there is a third line with a flow rate sensor.

The two pressure sensors located on the first and second lines can be replaced by a differential pressure sensor between the first line and the second line. Likewise, the flow rate sensor in the third line can be replaced by an output sensor which measures a combination of the pressure and the flow rate, e.g. the output. Output in fluid dynamics is defined as the product of the flow rate and pressure and can also be measured as a parameter to determine when the measuring bridge is balanced and/or when the flow resistance of the flow channel equals the desired value.

To prevent disruptions in the operation of the device, caused for example by a detachment of particles from the flow channel that can lead to a miscalibration of the flow channel, the flow channel in the measuring bridge is located behind the first impedance in the direction of flow of the fluid. This arrangement guarantees that particles that detach from the flow channel do not become stuck in the impedances or in or on the detectors and thus falsify the calibration of the impedance.

The device claimed by the invention advantageously comprises a lock-in amplifier to improve the signal-to-noise ratio of the parameter. The parameter is thereby analyzed and amplified on a frequency-selective basis at a modulation frequency. For this purpose, the device includes a modulation frequency generator that modulates the flow rate through the flow channel or the pressure of the fluid upstream of the flow channel with a modulation frequency. A sensor measures the modulation frequency at the modulation frequency generator for the lock-in amplifier. The modulation frequency generator is advantageously the pump that is used to deliver the fluid.

BRIEF DESCRIPTION OF THE DRAWINGS

Additional advantages and details of the invention are explained in greater detail below with reference to the purely exemplary embodiment that is illustrated in the accompanying schematic drawings, in which.

DETAILED DESCRIPTION OF THE INVENTION

Figure 1:
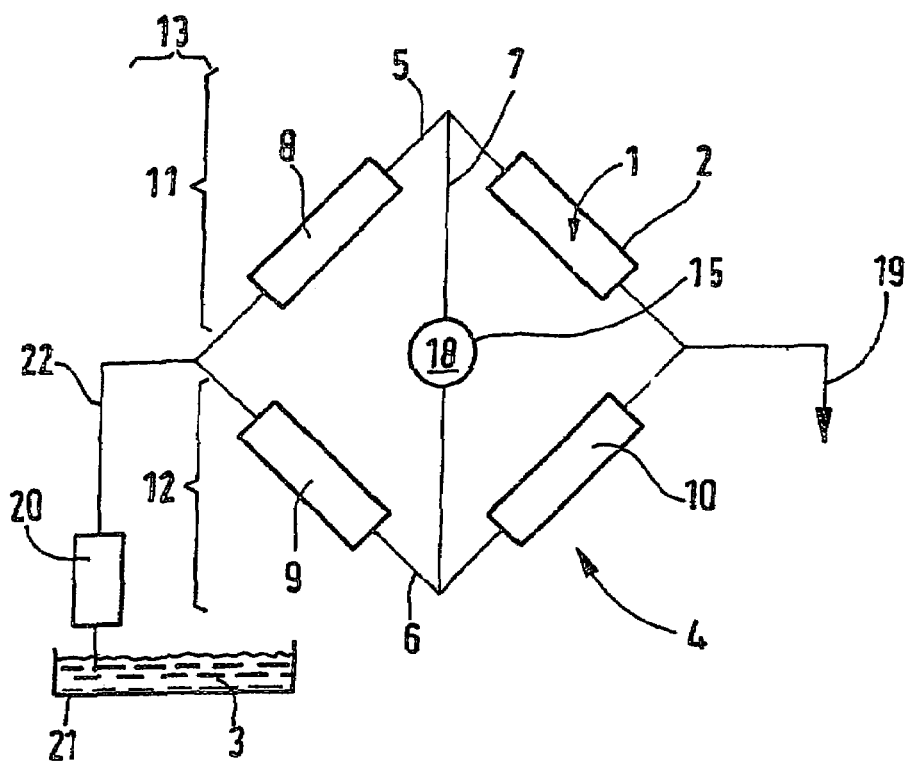
FIG. 1 illustrates a first exemplary embodiment of the device claimed by the invention to achieve a determined flow resistance by means of a Wheatstone bridge.

FIG. 1 shows a first exemplary embodiment as claimed by the invention to achieve a determined flow resistance of a flow channel 1, in particular an opening in a component 2, with a fluid reservoir 21, a device 20 to product a fluid flow, for example a generator, a pump, a pressure reservoir or similar device, and a measuring bridge 4 in which the component 2 with the flow channel 1 is integrated.

A fluid 3 is pumped out of the fluid reservoir 21 by means of a piston pump 20, for example, via a feed line 22 into the measuring bridge 4, where it is divided into a first series circuit 11 and a second series circuit 12, which together are connected into a parallel circuit 13. The first series circuit 11 comprises a first impedance 8 and the flow channel 1. The second series circuit 12 comprises a second impedance 9 and a third impedance 10. The first impedance 8 is connected with the flow channel 1 in the first series circuit 11 by means of a first line 5. The second impedance 9 and the third impedance 10 are connected in the second series circuit 12 with a second line 6. The fluid 3 leaves the measuring bridge 4 by means of a discharge 19, for example.

The parameter is determined by means of a flow rate sensor 18, which [measures] the flow rate in a third line 7 which connects the first line 5 with the second line 6. In the balanced condition of the measuring bridge, the quotient of the flow resistance of the flow channel 1 and the flow resistance of the first flow resistance 8 is equal to the quotient of the flow resistance of the third impedance 10 and the flow resistance of the second impedance 9. In the balanced condition, the fluid current flowing in the third line 7 disappears. As soon as the parameter has reached its specified set point, in particular when the balanced condition of the measuring bridge is reached, the working method for the machining of the flow channel is interrupted by means of a control system (not shown).

Figure 2:
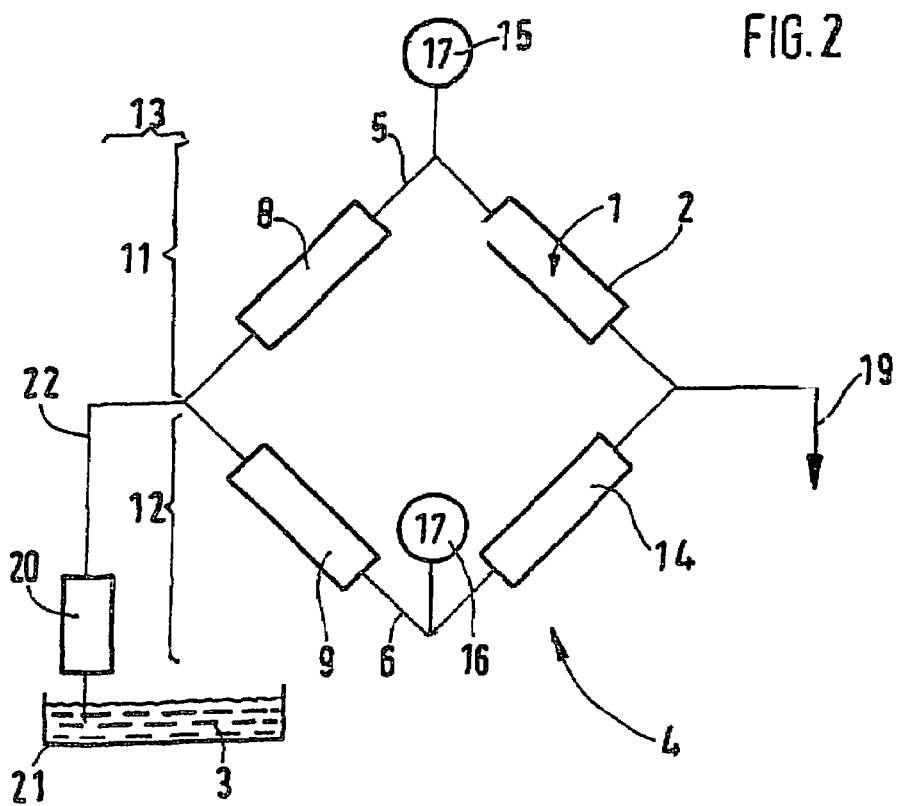
FIG. 2 illustrates an additional device as claimed by the invention.

FIG. 2 shows a variant of the device claimed by the invention illustrated in FIG. 1 with the distinction that between the line 5 and the second line 6, the pressure difference is measured, whereby a detector 15 is provided in the first line 5 and a detector 16 is provided in the second line 6. The two detectors 15, 16 are preferably realized in the form of pressure sensors 17. By means of the detectors 15, 16, a difference in pressure is measured between the first line 5 and the second line 6. When the measuring bridge is balanced the pressure difference disappears.

A set point for the parameter is specified by means of a variable resistance 14. This set point can be specified, for example, by using a master object (not shown) instead of the component 2 and the variable resistance 14 is varied so that the pressure difference, i.e. in this case the parameter, disappears, as a result of which the balanced condition of the measuring bridge is set to the flow resistance of the flow channel.

The method claimed by this invention to achieve a determined flow resistance of a flow channel 1, in particular of an opening in a component 2, comprises the following steps: a fluid 3 flows through the flow channel 1; a parameter is determined which is a function of the flow resistance of the flow channel 1 in the component 2; the flow channel 1 is machined with a working method until the parameter reaches a specified set point wherein the parameter is determined by means of a measuring bridge 4.

The method claimed by the invention as well as the device suitable for the performance of the method claimed by the invention are characterized by, among other things, the fact that a determined flow resistance of a flow channel in components such as spray nozzles or gas turbine blades can be achieved with a high degree of precision, without either special design and construction requirements for the characteristics of the device used for the production of a fluid current or means to stabilize the pressure or flow rates, as suggested in the prior art.

The invention claimed is:

1. A method to machine a flow channel of a component and to achieve a determined flow resistance of said flow channel, comprising the steps of:
   a) pumping a fluid through the flow channel, wherein the flow channel is contained within a closed loop;
   b) machining the flow channel with a working method;
   c) pausing the machining and measuring a parameter which is a function of the flow resistance of the flow channel in the component; and
   d) restarting the machining until the parameter has reached a specified set point, at which time the machining is stopped;
   e) wherein the parameter is determined by means of a measuring bridge.

2. The method as claimed in claim 1, wherein the step of machining the flow channel consists of one from the group of chemical machining, hydroabrasive machining, mechanical machining, electrochemical machining, electroerosion machining, electroplating, electroless plating, coating and vacuum metallizing.

3. The method as claimed in claim 1, wherein the measuring bridge is constructed according to the principle of a Wheatstone bridge, in which the flow channel is connected by means of a first line with a first impedance and the flow channel to form a first series circuit and a second impedance is connected by means of a second line with a third impedance to form a second series circuit; and in which the first series circuit and the second series circuit are connected to form a parallel circuit; and whereby a fluid flows through the parallel circuit and the parameter, which is the pressure difference of the fluid between the first line and the second line, is determined, whereby the first line is connected with the second line.

4. The method as claimed in claim 3, wherein at least one resistance from the group that includes the first impedance, the second impedance and the third impedance is variable and wherein the variable resistance is specified so that the measuring bridge is balanced as soon as the desired set point of the flow channel is reached.

5. The method as claimed in claim 4, wherein the variable resistance is specified by means of a master object, by replacing the flow channel with the master object and balancing the measuring bridge by setting the variable resistance.

6. The method as claimed in claim 1, wherein the set point is determined for a specifiable average flow rate or for a specifiable average pressure.

7. The method as claimed in claim 1, wherein fluid is pumped through the channel at an average pressure of between 3 and 8 bar.

8. The method as claimed in claim 7, wherein the average machining pressure is between 4 and 6 bar.

9. The method as claimed in claim 1, wherein a measurement of said parameter is performed during a machining pause when the flow channel is free of an inserted cathode, or at least free of an applied electrical voltage.

10. The method as claimed in claim 1, wherein the fluid comprises electrolytic solutions, corrosive fluids, dielectric fluids and/or carrier gases.

* * * * *